United States Patent
Choi et al.

(10) Patent No.: US 8,704,455 B2
(45) Date of Patent: Apr. 22, 2014

(54) AVERAGE OUTPUT CURRENT ESTIMATION USING PRIMARY-SIDE SENSING

(75) Inventors: Jinho Choi, Cupertino, CA (US);
Yangsoo Park, Pleasanton, CA (US);
Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 205 days.

(21) Appl. No.: 13/246,515

(22) Filed: Sep. 27, 2011

(65) Prior Publication Data

US 2012/0081029 A1    Apr. 5, 2012

Related U.S. Application Data

(60) Provisional application No. 61/389,655, filed on Oct. 4, 2010.

(51) Int. Cl.
*H05B 37/02* (2006.01)

(52) U.S. Cl.
USPC ............................. 315/291; 315/297; 315/294

(58) Field of Classification Search
USPC .............. 315/177, 297, 294–295, 209 R, 185
See application file for complete search history.

(56) References Cited

U.S. PATENT DOCUMENTS

| | | | |
|---|---|---|---|
| 7,057,907 B2 | 6/2006 | Oh | |
| 2007/0221267 A1 | 9/2007 | Fornage | |
| 2008/0007982 A1* | 1/2008 | Piper et al. | 363/97 |
| 2009/0224703 A1* | 9/2009 | Woods et al. | 318/17 |
| 2010/0026208 A1* | 2/2010 | Shteynberg et al. | 315/297 |

OTHER PUBLICATIONS

PCT International Search Report, Application No. PCT/US11/053481, Jan. 20, 2012.

* cited by examiner

*Primary Examiner* — Douglas W Owens
*Assistant Examiner* — Amy Yang

(57) ABSTRACT

In one embodiment, an apparatus includes a transformer comprising a primary side and a secondary side. A switch is coupled to the primary side. A control signal circuit is configured to: sample a first current on the primary side of the transformer; estimate a second current value on the secondary side of the transformer using the sampling of the first current on the primary side and a turn ratio of the transformer; and output a signal to control a turn on time for the switch.

20 Claims, 6 Drawing Sheets

AVERAGE OUTPUT CURRENT ESTIMATION USING PRIMARY-SIDE SENSING

CROSS REFERENCE TO RELATED APPLICATIONS

The present disclosure claims priority to U.S. Provisional App. No. 61/389,655 for "Average Output Current Estimation for Flyback Converter Using Primary-side Sensing" filed Oct. 4, 2010, which is incorporated herein by reference in its entirety for all purposes.

BACKGROUND

Particular embodiments generally relate to current estimation.

Unless otherwise indicated herein, the approaches described in this section are not prior art to the claims in this application and are not admitted to be prior art by inclusion in this section.

The use of electronic devices is popular in stationary and mobile environments. One kind of visual display is typically used in both environments. For example, the same kind of visual display is used in electronic devices from large sign/advertising boards to cellular phones or portable game players. Energy consumption is a concern in the design of the electronic devices. For example, in the marketplace, an electronic device that uses less energy may take significant precedence over other devices.

Light-emitting diodes (LEDs) are being used in displays because of the LEDs' energy efficiency, reliability, low maintenance, and environmental friendliness. LEDs have been used in various devices, such as signal devices (e.g. traffic lights, exit signs, and signboards) as well as in some illumination devices, such as flashlights. Additionally, LEDs may be used in light sources for general illumination in homes to commercial applications. LEDs have many advantages, such as long life, energy savings, better quality light output, safety, size, and durability.

A single-stage flyback solution for driving LEDs is used because of the flyback solution's simplicity and cost reduction. The flyback solution requires that a current be detected on the secondary side of a transformer of the flyback solution. This increases the amount of components in the implementation, such as output components, secondary constant current control circuits, and an optocoupler are needed on the secondary side. These components are used to detect the current on the secondary side and then send the current value back to the primary side. The detected current is used by the primary side to adjust an on and off time of a switch in the flyback solution.

SUMMARY

In one embodiment, an apparatus includes a transformer comprising a primary side and a secondary side. A switch is coupled to the primary side. A control signal circuit is configured to: sample a first current on the primary side of the transformer; estimate a second current value on the secondary side of the transformer using the sampling of the first current on the primary side and a turn ratio of the transformer; and output a signal to control a turn on time for the switch.

In one embodiment, the apparatus includes an analog to digital (ADC) converter configured to sample the first current and output a digital value representing a value of a second current; an output current estimator configured to determine an average of the second current; an accumulator configured to determine an error current using the average current and a reference current; and a control signal generator configured to generate the control signal based on the error current.

In one embodiment, a system includes a load coupled to the secondary side of the transformer and configured to receive a second current based on the second current values.

In one embodiment, a method includes determining a sampling time to sample a first current on a primary side of a transformer based on a turn on time of a switch coupled to the primary side. The first current is sampled on the primary side of the transformer. A turn ratio is determined between the primary side of the transformer and a secondary side of the transformer. A second current value on the secondary side of the transformer is determined using the sampling of the first current on the primary side and the turn ratio. A signal is output to control a turn on time for the switch.

In one embodiment, determining the second current value includes: determining a plurality of second current values for multiple samplings of the first current during a half line cycle of an input signal and accumulating the plurality of second current values to estimate the second current during the half line cycle.

In one embodiment, the second current value is determined based on a turn off time of the switch, the first current sampled during the turn on time of the switch, a frequency of an input signal, and the turn ratio.

The following detailed description and accompanying drawings provide a more detailed understanding of the nature and advantages of the present invention.

DETAILED DESCRIPTION

Described herein are techniques for a current estimation system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
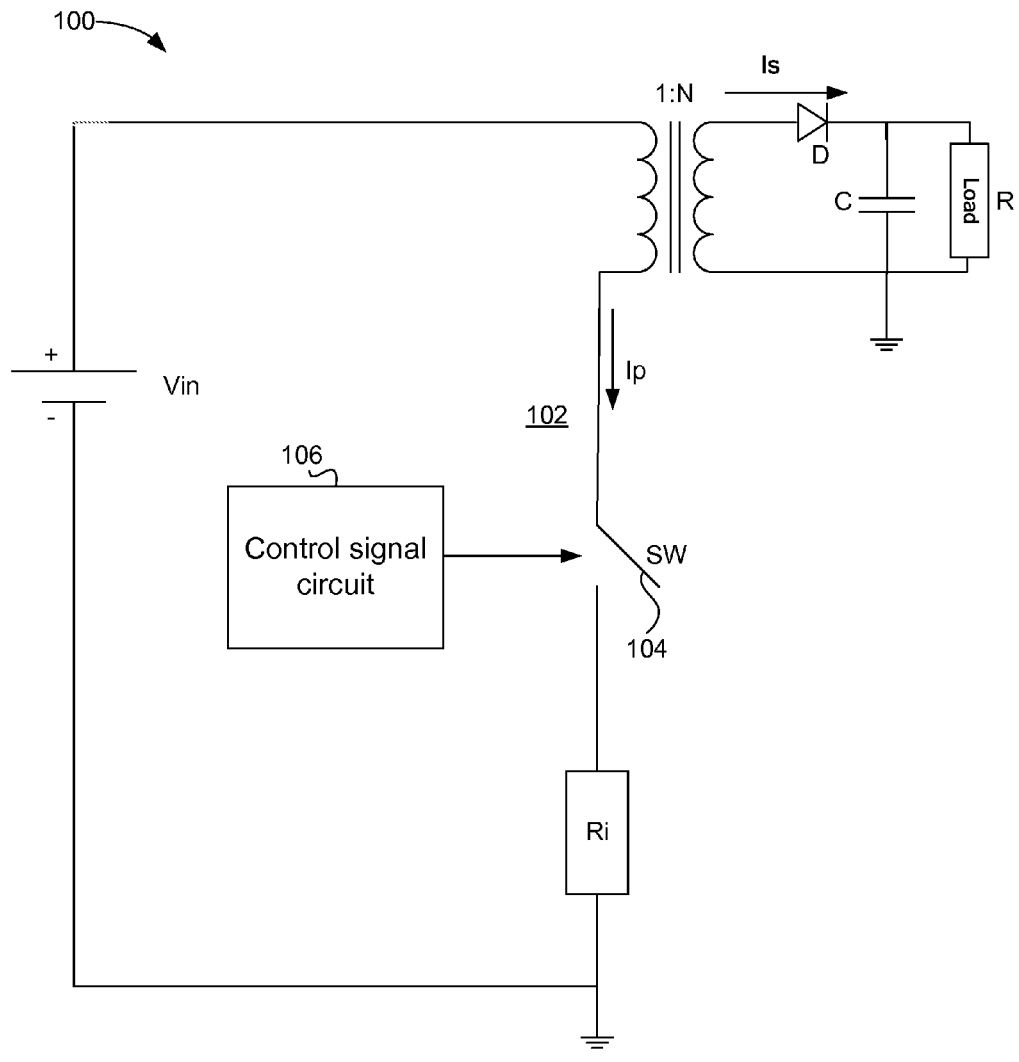
FIG. 1 depicts a circuit for estimating current according to one embodiment.

FIG. 1 depicts a circuit 100 for estimating current according to one embodiment. Circuit 100 includes a transformer 102, a switch (SW) 104, an input voltage $V_{in}$, a diode (D), a capacitor (C), a load (R), and an input resistor ($R_i$). In one embodiment, circuit 100 may be a single-stage flyback solution; however, other circuits may be used where a primary current ($I_p$) is detected on a primary side and used to estimate a secondary current ($I_s$) on a secondary side. The primary current $I_p$ is the current through the primary side of transformer 102. The secondary current $I_s$ is the current through the secondary side of transformer 102.

When switch 104 is on, the primary side of transformer 102 is directly connected to input voltage $V_{in}$. This results in an increase of magnetic flux in a primary winding of transformer 102. The voltage across a secondary winding of transformer 102 is negative such that diode D is reverse-biased (e.g., blocked). At this time period, capacitor C supplies energy to load R. In one embodiment, load R may be a LED/LED string that is being driven by circuit 100, but other loads may be used. When switch 104 is off, the energy stored in the primary winding of transformer 102 is transferred to the secondary winding. The energy is then transferred to load R through diode D, which is forward biased.

Particular embodiments calculate the primary current $I_p$ on the primary side of transformer 102 and use the calculated primary current $I_p$ to estimate the secondary current $I_s$ through the secondary side of transformer 102. The estimation of the secondary current $I_s$ from the secondary side is used to adjust a control signal that is used to control switch 104. For example, a control signal circuit 106 is used to output the control signal that turns switch 104 on and off. The on and off time may be varied based on the estimated secondary current. In one embodiment, the on and off time may be varied to control the power provided to the LED/LED string. Using the primary current $I_p$ to estimate the secondary current $I_s$ reduces the complexity of circuitry on the secondary side.

Figure 2:
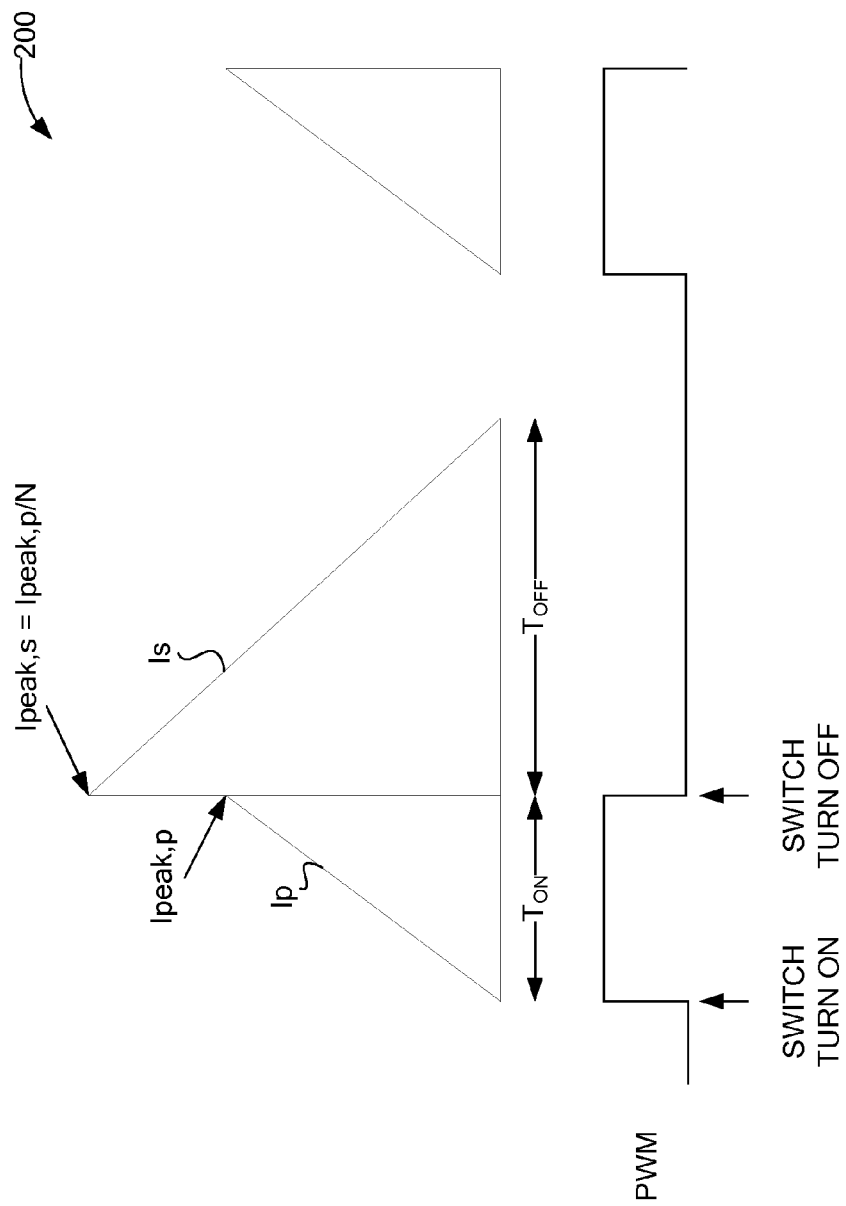
FIG. 2 depicts a graph showing the relationship between the primary current and the secondary current according to one embodiment.

FIG. 2 depicts a graph 200 showing the relationship between the primary current $I_p$ and the secondary current $I_s$ according to one embodiment. The control signal (PWM) shows the turn on time and turn off time of switch 104. In one example, switch 104 may be implemented using a MOSFET (not shown) that is turned on and off to close switch 104 and open switch 104.

An on time $T_{ON}$ is the switch on time. A constant on time $T_{ON}$ is applied for a half line cycle. A constant $T_{ON}$ time guarantees the power factor correction of circuit 100. The off time $T_{OFF}$ is defined by the duration of turning switch 104 off to allow the secondary current $I_s$ to reach zero.

A peak current $I_{peak, p}$ of the primary side and the peak current of the secondary side, $I_{peak,s}$, may be related based on a turn ratio N of transformer 102. For example, the following equations may be used to determine the peak secondary current:

$$I_{peak,p} = \frac{V_{in}}{L_p} T_{ON} \quad (1)$$

$$I_{peak,p} = \frac{V_{out}}{NL_p} T_{Off}(t) \quad (2)$$

$$I_{peak,s} = I_{peak,p} / N \quad (3)$$

In equation 1, $L_p$ is the inductance value of the primary side inductor, $V_{in}$ is the input voltage, and $T_{ON}$ is the on time for switch 104. In equation 2, N is the turn ratio between the primary side winding and the secondary side winding of transformer 102 and $T_{OFF}(t)$ is the off time of switch 104 in relationship to time. As can be seen in equation 3, the peak secondary current $I_{peak,s}$ is equal to the peak primary current $I_{peak,p}$ divided by the turn ratio N.

Figure 3:
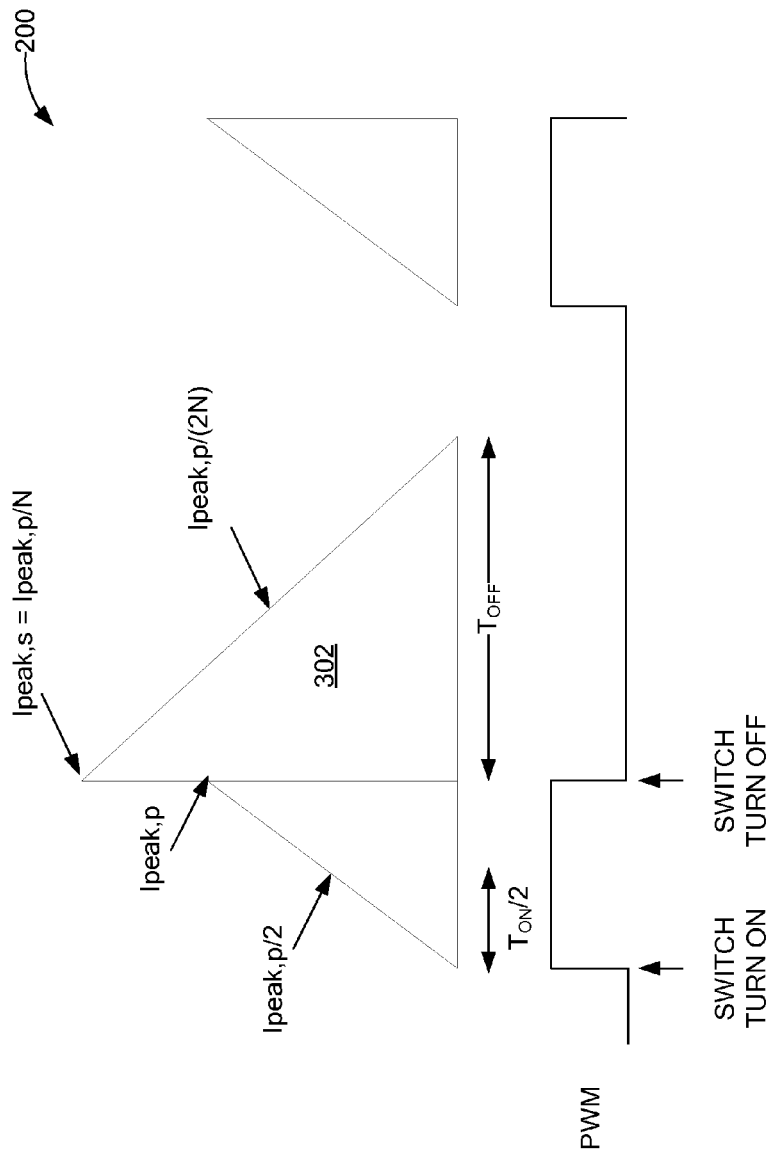
FIG. 3 depicts the sampling of the primary current and the secondary current according to one embodiment.

Particular embodiments sample the primary current $I_p$ at a time while switch 104 is on. For example, the primary current $I_p$ is sampled in the middle of the on period ($T_{on\backslash 2}$) of switch 104. FIG. 3 depicts the sampling of the primary current $I_p$ and the secondary current $I_s$ according to one embodiment. The primary current $I_p$ is sampled halfway between zero and the peak $I_{peak}$, which is $I_{peak, p}/2$. The current may also be sampled at other times. The peak current sampled on the primary side is equal to:

$$I_p|_{t=T_{ON}/2} = I_{peak,p}/2 \quad (4)$$

The secondary current $I_s$ can be estimated for one switching cycle. A switching cycle is a time period of turning switch 104 on and turning switch 104 off until switch 104 is turned back on. In this case, the primary current $I_p$ goes from zero to the peak current $I_{peak,p}$ during the on time. The secondary current $I_s$ goes from the peak current on the secondary side $I_{peak,s}$ to zero during the off time. The total current through load R for the secondary side is equal to the area in the triangle shown at 302. The area may be equal to:

$$I_{area,s}(t) = \frac{I_{peak,s}}{2} * T_{OFF}(t) \quad (5)$$

$$= \frac{I_{peak,p}}{2N} * T_{OFF}(t) \quad (6)$$

$$= \frac{I_p(T_{ON}/2)}{N} * T_{OFF}(t) \quad (7)$$

In equation 5, $I_{area, s}(t)$ is the area shown at 302, $I_{peak, s}$ is the peak current on the secondary side, and $T_{off}(T)$ is the off time. In equation 6, the current $I_{peak,s}$ is replaced by the current $I_{peak,p}/N$. The value for current $I_{peak,s}$ is determined from equation 3, which is the relationship between the primary side peak current and the secondary side peak current. Equation 4 is used to replace the primary side peak current $I_{peak, p}/2$ to derive equation 7. In this case, $I_{peak, p}/2$ is replaced by $I_p(t)$ at time=$T_{ON/2}$. Equation 7 is the total current through load R during the off time. Thus, the area shown at 302 is a function of the primary current $I_p$, the turn ratio, and the on and off times of switch 104.

Figure 4:
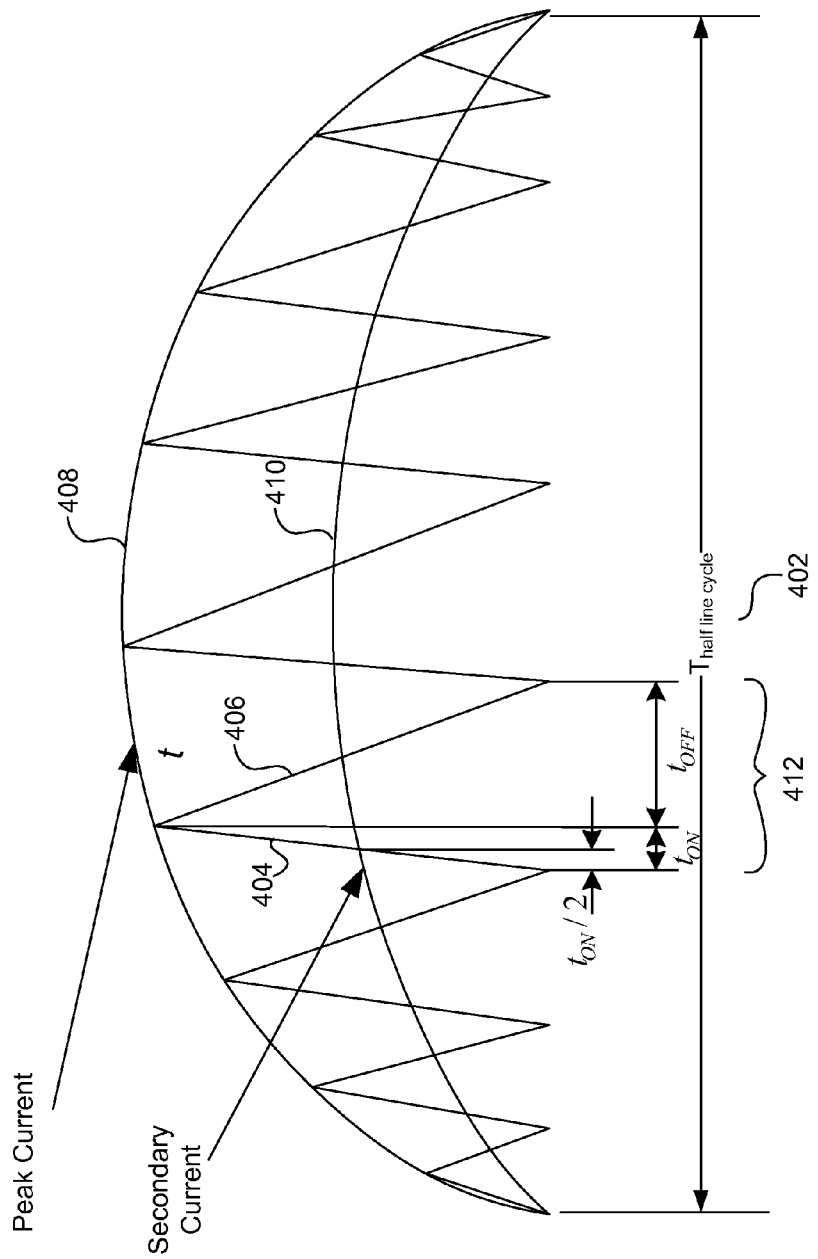
FIG. 4 shows a half line cycle $T_{half\,line\,cycle}$ according to one embodiment.

FIG. 4 shows a half line cycle $T_{halfline\,cycle}$ according to one embodiment. During the half line cycle, multiple switching cycles are performed. For example, switch 104 is turned on and off multiple times. For one switching cycle, the primary current $I_p$ through the primary side is shown at 404 and the secondary current $I_s$ through the secondary side is shown at 406. A peak inductor current is shown at 408, which is current $I_{peak, p}$. The secondary current $I_s$ is shown at 410. For each switching cycle, a value for the secondary current $I_{area,s}(t)$ may be determined. For example, values for $T_{ON/2}$, $T_{OFF}$, and N may be determined for a period shown at 412. Equation 7 is used to determine the secondary current $I_s$. The values for the secondary current $I_s$ may be accumulated over the half line cycle to determine the average secondary current $I_{avg,s}$. For example, the values for each switching cycle are estimated and averaged. The following equations may be used to determine the average secondary current:

$$I_{avg,s} = \frac{\sum_{halflinecycle} I_{area,s}(t)}{T_{halflinecycle}} \quad (8)$$

$$= \frac{\sum_{halflinecycle} I_p(T_{ON}/2) * T_{OFF}(t)}{N * T_{halflinecycle}} \quad (9)$$

$$T_{halflinecycle} = \frac{1}{2f} (f \text{ is the AC input line frequency}) \quad (10)$$

In equation 8, the midpoints of the secondary current $I_s$ are accumulated and divided by the time of the half line cycle to estimate the average secondary current $I_{avg,s}$. This is for one half line cycle. In equation 9, the area of the secondary current $I_{area,s}(t)$ is replaced by corresponding equation found in equation 7. The time $T_{halflinecycle}$ is equal to 1\2f where f is the frequency of the alternating current (AC) input. Accordingly, the values for the secondary current $I_s$ are accumulated and averaged over the half line cycle time. The secondary current $I_s$ can be determined from the primary current $I_p$, the on time of the switch 104, the off time of switch 104, the turn ratio, and the frequency of the input signal.

Figure 5:
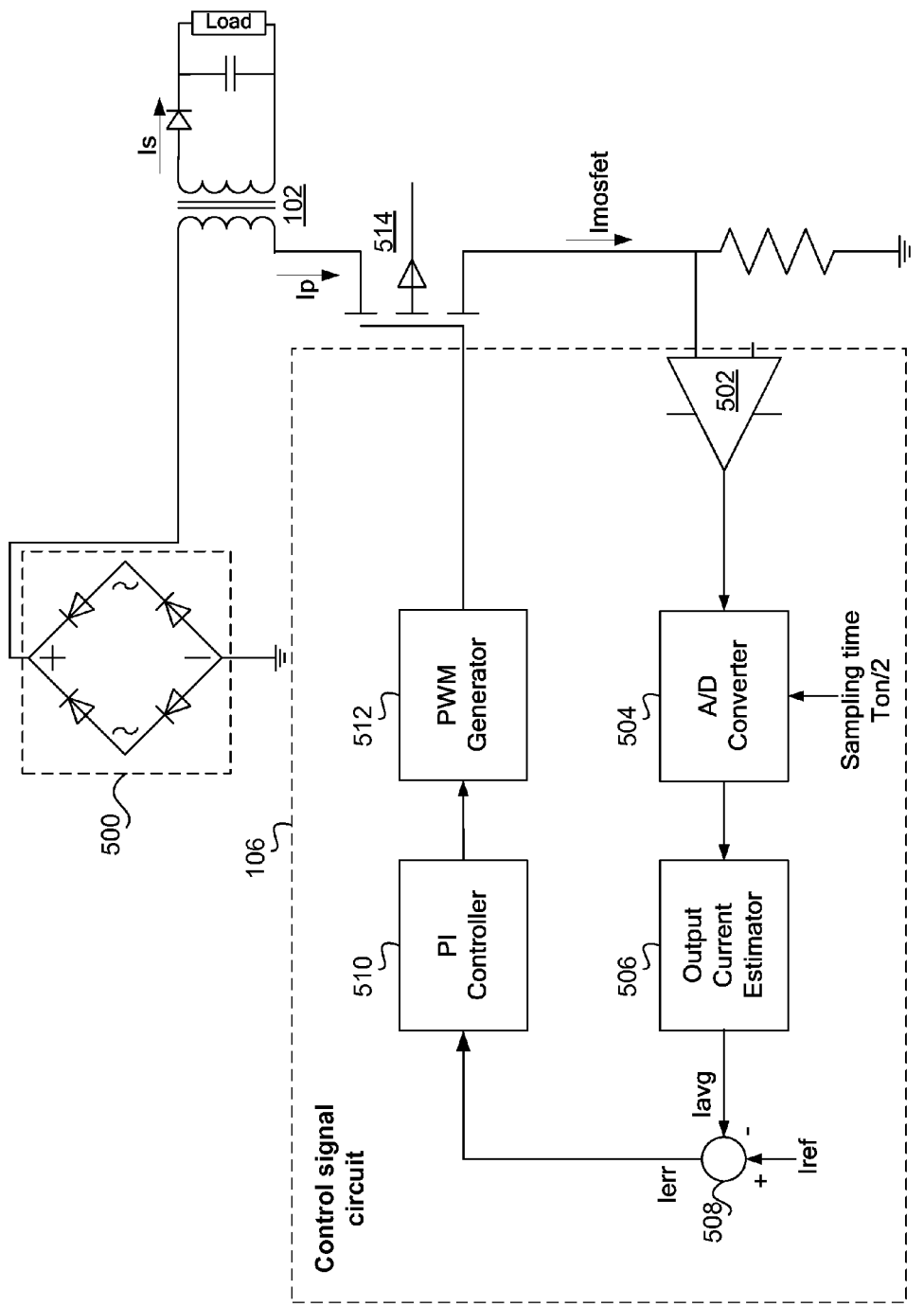
FIG. 5 depicts a more detailed example of the control signal circuit according to one embodiment.

FIG. 5 depicts a more detailed example of control signal circuit 106 according to one embodiment. An input circuit 500 provides the input signal that is a half wave rectified AC signal. The input signal is input into the primary side of transformer 102.

Control signal circuit 106 includes an amplifier 502 that receives current Imosfet. Current Imosfet is the primary current $I_p$ through MOSFET 514. Amplifier 502 amplifies current Imosfet and outputs an amplified signal to analog-to-digital converter (ADC) 504. ADC 504 samples the signal output by amplifier 502 at different sampling times. For example, sampling time is set at $T_{ON}/2$, which is the halfway point between the on time of MOSFET 514. The signal is sampled at each halfway point in the switching cycles in a half line cycle.

At the sampling time, ADC 504 outputs a digital value into an output current estimator 506. The output of ADC 504 is the value for the secondary current $I_{area,s}$. For example, equation 7 is used to determine the secondary current $I_s$. Output current estimator 506 accumulates the values for a half line cycle.

The average value $I_{avg}$ is output by output current estimator 506 into an accumulator 508. This is the average value for the secondary current $I_s$. For example, equation 9 is used to determine the average secondary current. Accumulator 508 compares current $I_{avg}$ to a reference current $I_{ref}$. The difference is an error signal $I_{err}$. This represents that error in the secondary current $I_s$.

The error signal is input into a proportional-integral (PI) controller 510. PI controller 510 calculates a duty cycle as a function of the error signal $I_{err}$. PI controller 510 outputs a PI signal into a pulse width modulation (PWM) generator 512. The control signal output by PI controller 510 controls the duty cycle of a PWM signal output by PWM generator 512. This increases or decreases the on time of MOSFET 514 to minimize the error current $I_{err}$. Increasing or decreasing the on time changes the value of the secondary current $I_s$ by changing the amount of energy transferred from the primary winding to the secondary winding.

Figure 6:
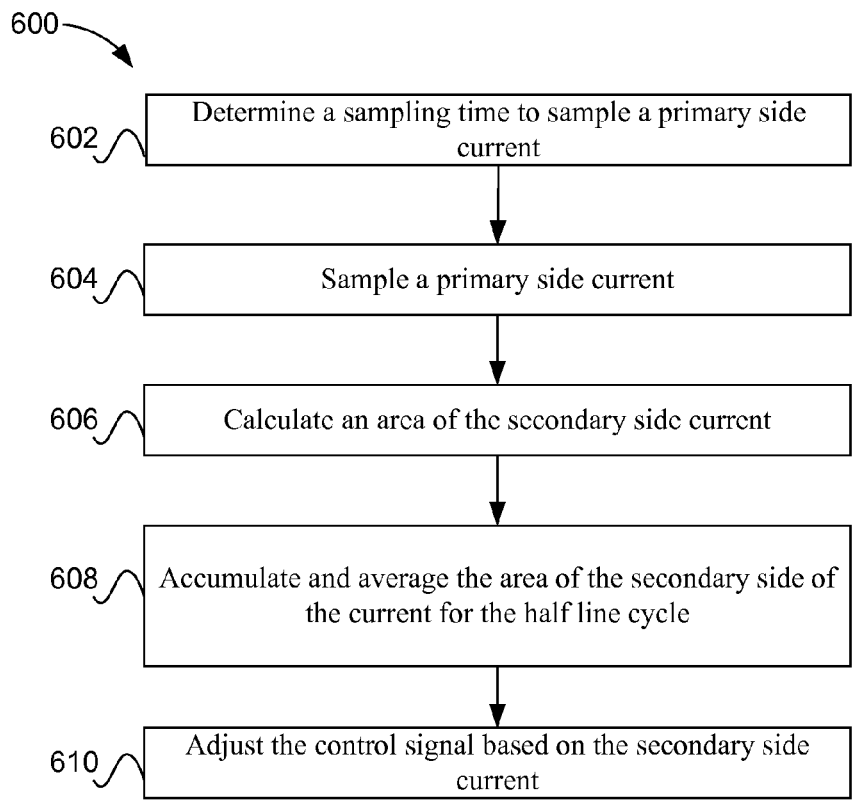
FIG. 6 depicts a simplified flowchart of a method for estimating a secondary current according to one embodiment.

FIG. 6 depicts a simplified flowchart 600 of a method for estimating a secondary current $I_s$ according to one embodiment. At 602, a sampling time to sample a primary current $I_p$ is determined. For example, the sampling time may be a midpoint of the on time of switch 104.

At 604, a primary current $I_p$ is sampled. At 606, an area of the secondary current $I_s$ is calculated. The area estimates the secondary current $I_s$ for the off time of switch 104. At 608, the area of the secondary side of the current is accumulated and averaged for the half line cycle. This yields the secondary current $I_s$. At 610, the control signal is adjusted based on the secondary current $I_s$ though the inductor on the secondary side of transformer 102.

Particular embodiments provide many advantages. For example, circuit complexity on the secondary side is reduced. The complexity of transferring a current read from the secondary side to the primary side may be more complex than the circuitry used by particular embodiments to estimate the secondary current $I_s$ using the primary current $I_p$. The estimation of the secondary current $I_s$ may be accurate enough for proper operation of the circuit.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method, comprising:
    determining a sampling time to take a sample of a first current on a primary side of a transformer, wherein the sampling time is determined based on a turn on time of a switch coupled to the primary side;
    taking the sample of the first current on the primary side of the transformer at the sampling time;
    calculating an area of a second current on a secondary side of the transformer using i) the sample of the first current taken on the primary side and ii) a turn ratio of the transformer; and
    outputting a signal to control the turn on time for the switch, wherein the signal controls the turn on time for the switch based on the calculated area of the second current,
    wherein calculating the area of the second current on the secondary side of the transformer includes calculating the area of the second current according to $$\frac{I_P\left(\frac{T_{ON}}{2}\right)}{N} * T_{OFF}(t),$$

where $I_p$ corresponds to the sample taken of the first current, $T_{ON}$ corresponds to the turn on time of the switch, N corresponds to the turn ratio of the transformer, and $T_{OFF}$ corresponds to a turn off time of the switch.

2. The method of claim 1, wherein calculating the area of the second current comprises:
    determining a plurality of second current values for multiple samplings of the first current during a half line cycle of an input signal; and
    accumulating the plurality of second current values to estimate the area of the second current during the half line cycle.

3. The method of claim 2, further comprising averaging the accumulated plurality of second current values.

4. The method of claim 1, wherein the area of the second current is calculated based on a turn off time of the switch, the sample of the first current taken during the turn on time of the switch, a frequency of an input signal, and the turn ratio.

5. The method of claim 1, wherein taking the sample of the first current comprises sampling the first current using an analog to digital converter (ADC) at multiple sampling times and outputting multiple second current values based on the sample of the first current.

6. The method of claim 5, further comprising:
receiving the multiple second current values; and
accumulating the multiple second current values into an average second current.

7. The method of claim 6, further comprising:
receiving the average second current; and
comparing the average second current with a reference current to determine an error signal.

8. The method of claim 7, further comprising:
receiving the error signal at a control signal generator; and
generating the signal to control the turn on time based on the error signal to control the turn on time of the switch.

9. The method of claim 8, wherein a duty cycle of the signal is altered to minimize the error signal.

10. An apparatus, comprising:
a control signal circuit coupled to a switch on a primary side of a transformer, the control signal circuit configured to:
determine a sampling time to take a sample of a first current on the primary side of the transformer, wherein the sampling time is determined based on a turn on time of the switch;
take the sample of the first current on the primary side of the transformer at the sampling time;
calculate an area of a second current on a secondary side of the transformer using i) the sample of the first current taken on the primary side and ii) a turn ratio of the transformer; and
output a signal to control the turn on time for the switch, wherein the signal controls the turn on time for the switch based on the calculated area of the second current,
wherein calculating the area of the second current on the secondary side of the transformer includes calculating the area of the second current according to $$\frac{I_P\left(\frac{T_{ON}}{2}\right)}{N} * T_{OFF}(t),$$

where $I_p$ corresponds to the sample taken of the first current, $T_{ON}$ corresponds to the turn on time of the switch, N corresponds to the turn ratio of the transformer, and $T_{OFF}$ corresponds to a turn off time of the switch.

11. The apparatus of claim 10, wherein the control signal circuit comprises:
an analog to digital (ADC) converter configured to sample the first current and output a digital value representing a value of the area of the second current;
an output current estimator configured to determine an average of second current values;
an accumulator configured to determine an error current using the average current and a reference current; and
a control signal generator configured to generate the control signal based on the error current.

12. The apparatus of claim 11, wherein the control signal circuit comprises a controller configured to calculate a duty cycle as a function of the error current.

13. The apparatus of claim 11, wherein
the signal is a pulse width modulation (PWM) signal; and
a duty cycle of the signal is altered based on the error current.

14. The apparatus of claim 13, wherein the turn on time of the switch is varied based on the duty cycle of the control signal.

15. The apparatus of claim 11, wherein the average of the second current values is determined for a half line cycle of an input signal.

16. The apparatus of claim 11, wherein the turn on time of the switch is altered to minimize the error current.

17. A system comprising the apparatus of claim 11, the system further comprising:
a load coupled to the secondary side of the transformer and configured to receive a second current based on the second current values.

18. The apparatus of claim 10, wherein the second current drives a load.

19. The apparatus of claim 18, wherein the load comprises a light emitting diode.

20. The apparatus of claim 10, wherein the first current is sampled during the turn on time of switch.

* * * * *